United States Patent [19]

La Giusa

[11] E Re. 30,832

[45] Reissued Dec. 22, 1981

[54] ELLIPSOIDAL REFLECTOR LAMP

[75] Inventor: Frank F. La Giusa, Cleveland Heights, Ohio

[73] Assignee: General Electric Company, Schenectady, N.Y.

[21] Appl. No.: 927,571

[22] Filed: Jul. 24, 1978

Related U.S. Patent Documents

Reissue of:

[64] Patent No.: 4,041,344
Issued: Aug. 9, 1977
Appl. No.: 718,525
Filed: Aug. 30, 1976

[51] Int. Cl.[2] ..... H01J 5/02; H01J 5/08; H01K 1/32

[52] U.S. Cl. ..... 313/113; 313/111; 313/116; 313/220; 362/307

[58] Field of Search ..... 313/113, 115, 116, 220, 313/111, 114; 362/296, 297, 301, 307

[56] References Cited

U.S. PATENT DOCUMENTS

| | | | |
|---|---|---|---|
| 1,275,120 | 8/1918 | Ballman et al. | 313/113 X |
| 1,804,049 | 5/1931 | Claus | 313/115 |
| 1,981,329 | 11/1934 | Rivier | 313/113 X |
| 2,198,097 | 4/1940 | Sweet | 313/111 |
| 2,901,655 | 8/1959 | Linsday et al. | 313/113 X |
| 3,136,913 | 6/1964 | Goodman | 313/111 |

OTHER PUBLICATIONS

Jolley et al., "The Theory and Design of Illuminating Engineering Equipment", Chapman & Halls, 1930, pp. 352–357.

*Primary Examiner*—Siegfried H. Grimm
*Attorney, Agent, or Firm*—Lawrence R. Kempton

[57] ABSTRACT

A blown glass reflector lamp having an ellipsoidal reflector and a clear or lightly frosted face is disclosed.

11 Claims, 4 Drawing Figures

ELLIPSOIDAL REFLECTOR LAMP

Matter enclosed in heavy brackets [ ] appears in the original patent but forms no part of this reissue specification; matter printed in italics indicates the additions made by reissue.

BACKGROUND OF THE INVENTION

This invention relates to reflector lamps and, in particular, to blown glass reflector lamps.

Among the many lamp characteristics involved in the choice of lamp for a particular application, PAR (Parabolic Aluminized Reflector) lamps are specified when light control is paramount. As known in the art, these lamps are made from a pressed glass lens and reflector which must be sealed together. Compared to lamps made from blown glass bulbs, PAR lamps are heavy, costly, and difficult to make at high production rates.

Reflector lamps of the prior art made from a blown glass bulb, while lower in cost, have poorer light control.

Because of the lens in PAR lamps or the shallow bulb with consequent poorer light control of reflector lamps, directed light lamps of the prior art are characterized by high brightness (face luminance) from nadir through most normal viewing angles, requiring external shielding or suitably designed luminaires to reduce the glare. Such shielding reduces the illumination provided by the lamp since light off-axis more than a predetermined amount is absorbed by the shielding. As understood by those in the art, "brightness" refers to the appearance of the lamp when the lamp is viewed directly and is the term used for face luminance. Except for certain decorative applications, lamps are used for seeing, i.e., for their ability to illuminate where illumination is the density of luminous flux upon a surface. The ideal directed light source has the seemingly contrary characteristics of producing high illumination and having zero brightness off-axis, or out of the desired cone of light.

In general, lamps of the prior art have not come very close to this ideal. A lamp having an approximately ellipsoidal reflector, known in the prior art, was identical to, except for the shape of the reflector, the PAR lamps noted above, i.e., heavy, costly, difficult to make, and using a lens to control light distribution. An elliptical lamp is disclosed in U.S. Pat. No. 1,981,329, although it is not disclosed how the lamp is made; i.e., it is not disclosed whether the lamp is blown or molded or whether glare is controlled.

SUMMARY OF THE INVENTION

In view of the foregoing, it is therefore an object of the present invention to provide a blown glass reflector lamp having improved light control.

Another object of the present invention is to provide a low brightness, high illumination blown glass reflector lamp.

Another object of the present invention is to provide a blown glass ellipsoidal reflector lamp.

A further object of the present invention is to provide a blown glass reflector lamp with the light control approaching that of a lighting fixture or luminaire.

The foregoing objects are achieved in the present invention wherein the lamp bulb is blown in the shape of half of an ellipsoid wherein the eccentricity of the ellipsoid is within the range of 0.88 to 0.66, inclusive. The face of the bulb closing the ellipsoid may be clear or, preferably, lightly frosted. An elongated neck is provided to separate the base from the filament to enable the base to remain cooler during lamp operation. The length of the neck can be reduced if a heat-reflecting shield is inserted therein around the mount. The reflective layer terminates at approximately the minor diameter of the ellipsoid so that the direct light and the reflected light diverge at approximately the same angle. The face of the lamp is positioned close to the minor diameter so that the light flux passing through is not sufficiently concentrated to cause high face luminance or overheat the glass.

BRIEF DESCRIPTION OF THE DRAWINGS

A more complete understanding of the present invention can be obtained by considering the following detailed description in conjunction with the accompanying drawings, in which.

DESCRIPTION OF THE PREFERRED EMBODIMENTS

Figure 1:
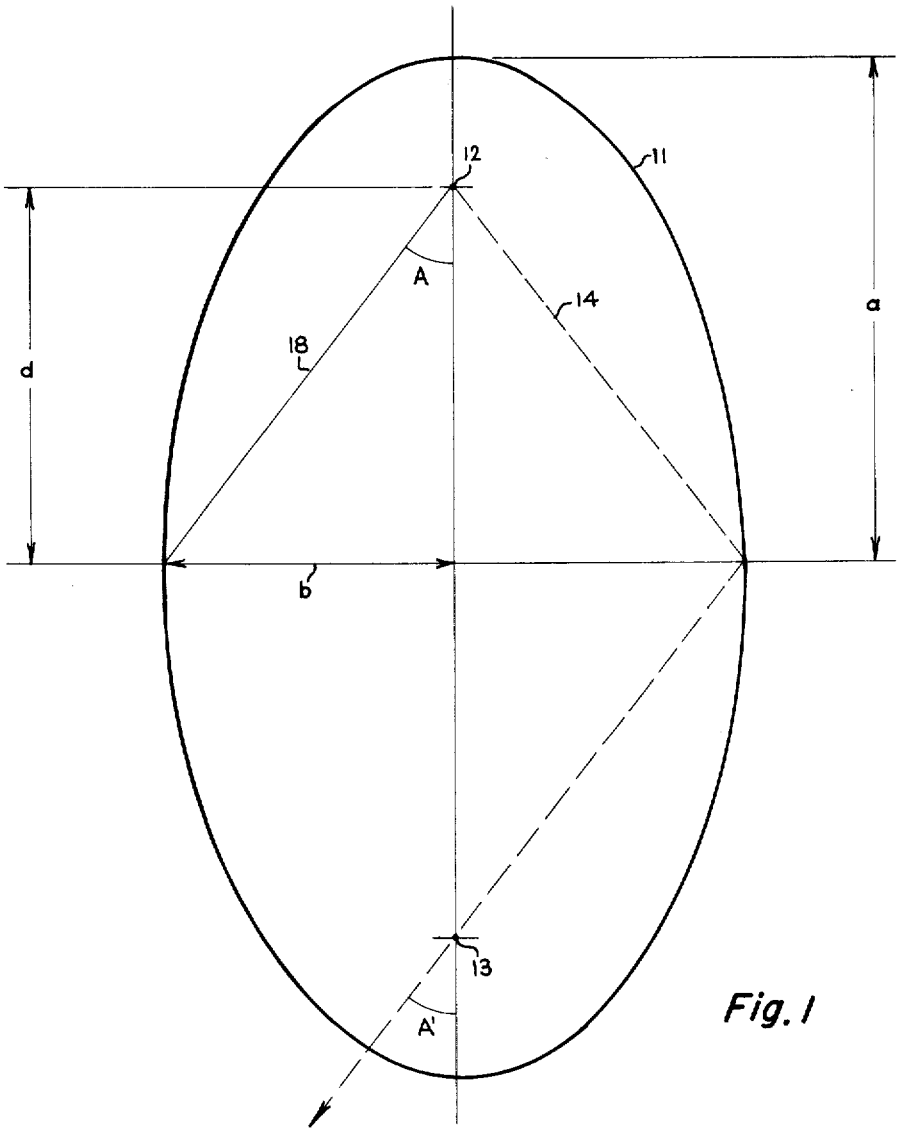
FIG. 1 illustrates an ellipse used in explaining the geometrical aspects of the present invention.

Referring to FIG. 1, ellipse 11 comprises semimajor axes a and b, wherein semimajor axis a is the longer of the two. As is well known from geometry, ellipse 11 is defined by two conjugate foci 12 and 13, where the term "conjugate foci" is understood to mean that a ray emanating from a point source at one focus will be reflected by any point on ellipse 11 to the other focus. While the ellipse of FIG. 1 is a plane FIGURE, it is understood that the discussion conerns an ellipsoid formed by the rotation of ellipse 11 about axis a.

It can be shown that line 18, which extends from focus 12 to the intersection of axis b with ellipse 11, is equal in length to axis a. Thus, angle A is equal to the inverse sine of b/a. Further, it can be shown that angle A', formed by the intersection of ray 14 with axis a at focus 13, is equal to angle A. It follows that the eccentricity of the ellipse, defined as $$k = [(a^2+b^2)^{\frac{1}{2}}/a,] \; (a^2-b^2)^{0.5}/a$$

is equal to cos A and that d, the distance from the intersection of axis a and b to either focus, is equal to a cos A.

As used herein, the term "minor diameter" refers to the diameter of the circle formed by a plane containing axis b and orthogonal to axis a intersecting the ellipsoid formed by the rotation of ellipse 11 about axis a.

Figure 2:
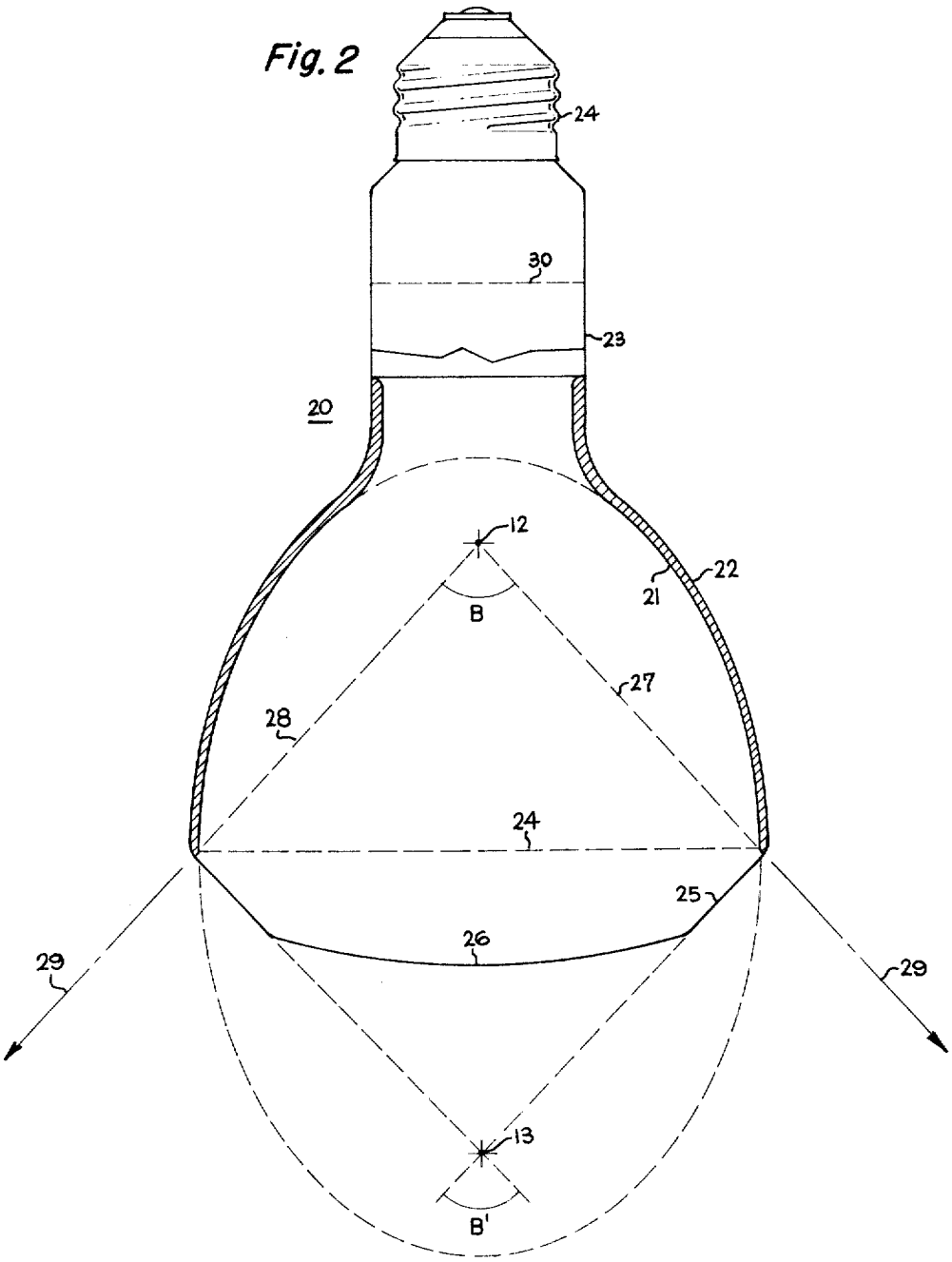
FIG. 2 illustrates a preferred embodiment of the present invention.

FIG. 2 illustrates a lamp in accordance with the present invention including the geometrical considerations of FIG. 1. Specifically, lamp 20 comprises an envelope having an ellipsoidal portion 22 and a neck portion 23. Ellipsoidal portion 22 is rendered specular, for example by a coating 21 of silver, aluminum, or other suitable material on the inner surface thereof. Since blown lamps comprise what is known as soft glass, as opposed to the hard glass of PAR lamps, neck portion 23 is elongated to isolate the seal area and base of the lamp from the filament and reduce thermal stress in the seal area. The length of the neck can be reduced by inserting heat shield 30 therein. The resultant lamp has a light center length approximately the same as a standard incandescent lamp of the same wattage.

Ellipsoidal portion 22 terminates at the open end thereof at approximately the minor diameter of the ellipsoid, at which point the radius of curvature of the surface changes to form a conical portion or frustum 25 and a curved portion 26. Conical portion 25 and curved portion 26 provide a suitably aesthetically pleasing shape. The end of the ellipsoid nearest focus 12 is terminated in neck portion 23 which, in turn, is connected to base 24.

Internally, the mount for the lamp in accordance with the present invention is conventional except that the filament is positioned so that at least a portion thereof intersects focus 12. It is preferred that the face of the lamp, comprising portions 25 and 26, be shaped so that the direct light from the filament at focus 12 is incident approximately normal to the surface. As illustrated in FIG. 2, this requirement is fulfilled by conical portion 25 and curved portion 26, wherein conical portion 25 follows the path taken by a theoretical ray of light 27 or 28 reflected by the very edge of the specular portion of the lamp and intersecting at focus 13. Curved portion 26 may, for example, comprise a section of a sphere having a radius equal to the length of axis a. This assures that the face of the lamp is no further than ½ d from the intersection of axes a and b and that the flux therethrough is not overly concentrated, thereby avoiding high face luminance or overheating of the face of the lamp.

As can be seen by inspection of FIG. 2, lamp 20 is efficient in terms of light control since focus 12 is well within the lamp such that majority of the light produced by the filament at focus 12 is reflected by the ellipsoidal reflective portion 22 and redirected as a cone of light through a solid angle B'. The direct light from the filament at focus 12 also fills solid angle B, as indicated by rays 29, thus contributing to low brightness of the lamp. However, since ellipsoidal portion 22 is silvered to approximately the minor diameter of the ellipsoid and is opaque to visible radiation, lamp 20 acts as its own shield and reduces the spread of light emanating therefrom thus achieving light control in a blown glass lamp only obtained in the prior art with shields or luminaires.

As previously discussed, the magnitude of angle B depends upon the eccentricity of the ellipsoid forming portion 22 of the envelope. It has been found that an ellipsoid having an eccentricity within the range of 0.66 to 0.88, inclusive, produces a lamp having good light control and reduced face luminance. Within this range of eccentricity, angle B as illustrated in FIG. 2 varies from approximately 97° to approximately 57°.

The improved light control obtainable with the lamp in accordance with the present invention produces several desired and heretofore not obtained results. For example, the combination of a conventional reflector lamp and a baffle may correspond approximately to the filament in the lamp of FIG. 2 and opaque reflecting surface 22. However, instead of being absorbed, as with the baffles of the prior art, the light intercepted by ellipsoidal surface 22 is reflected through conjugate [force] *focus* 13 and is emitted by the lamp. Thus, for lamps having filaments producing a given number of lumens per watt, the lamp in accordance with the present invention provides more illumination since light is not absorbed by a baffle but rather is reflected in a desired direction. Further, since the majority of the light passes through conjugate focus 13, even if the lamp in accordance with the present invention were installed in a deep baffle intercepting some of the direct light from the filament, the majority of the light would escape from the baffle because the filament is, in effect, at focus 13. However, the disadvantages of having a filament at focus 13 are not obtained since the light emanating from focus 13 is controlled and directed through solid angle B'.

Figure 3:
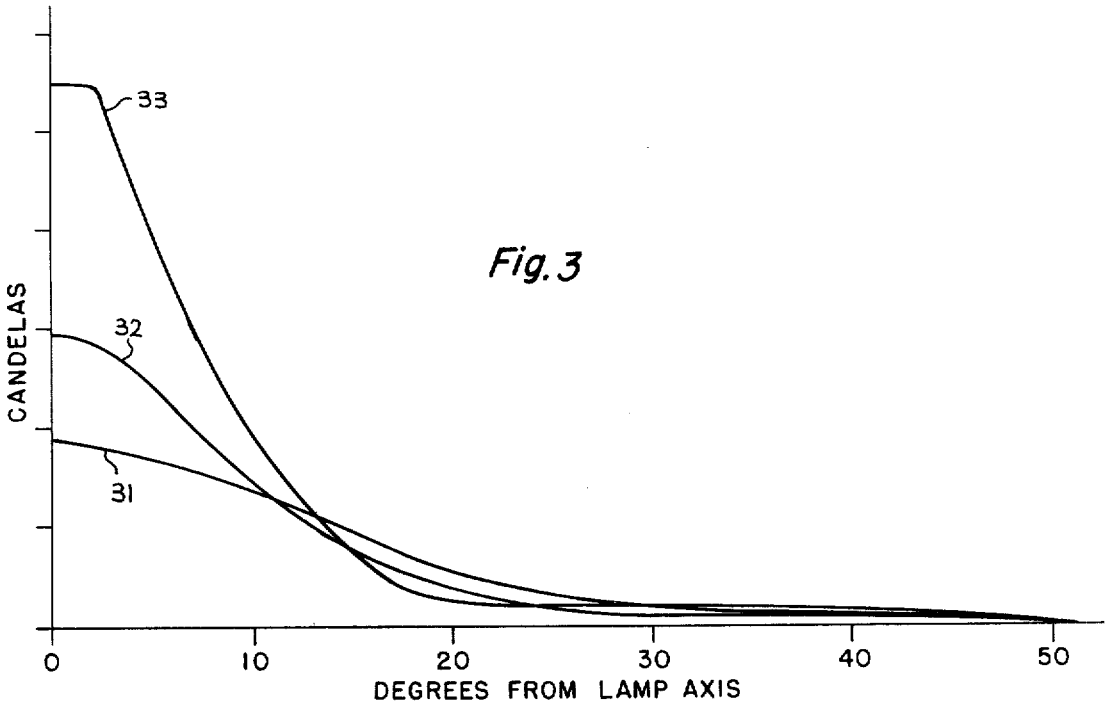
FIG. 3 is a comparison of a lamp in accordance with the present invention with reflector and PAR spot lamps.

FIG. 3 illustrates intensity distribution curves of an ellipsoidal reflector lamp in accordance with the present invention and other beam projection lamps. However, it is to be understood that the particular lamps involved, while having the same nominal wattage, did not utilize filaments having the same lumens-per-watt rating. This, however, is immaterial as it is the relative shapes of the curves that is of interest. The absicissa units correspond to angle A of FIG. 1 rather than angle B of FIG. 2 since the curves are symmetrical about the lamp axis. In FIG. 3, curve 31 illustrates the light output from a 75-watt ellipsoidal reflector lamp having an eccentricity of 0.78, for which angle A in FIG. 1 is approximately 39°. Curve 32 represents the light output from a 75-watt reflector spot lamp, while curve 33 represents the light output from a 75-watt PAR spot lamp. As can be seen by inspection, the ellipsoidal reflector lamp having this eccentricity produces a slightly broader beam than either spot lamp.

Figure 4:
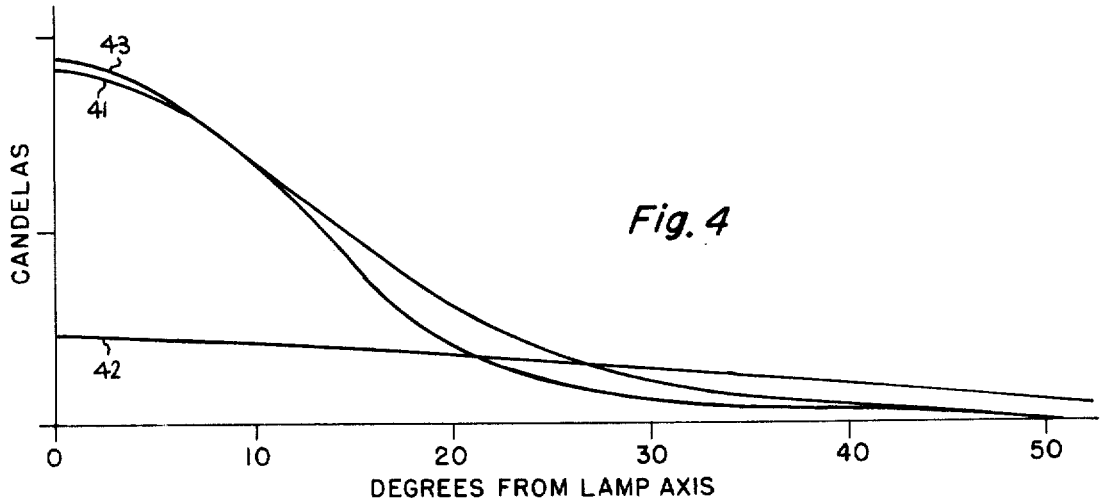
FIG. 4 is a comparison of a lamp in accordance with the present invention with reflector and PAR flood lamps.

FIG. 4 illustrates the intensity distribution curves for a lamp in accordance with the present invention and reflector and PAR flood lamps. Specifically, curve 41 corresponds to curve 31 of FIG. 3. Curve 42 is the energy distribution for a reflector [floor] *flood* lamp of the same wattage. Curve 43 is the energy distribution for a PAR flood lamp of the same wattage. As can be seen by inspection of FIG. 4, the particular ellipsoidal reflector lamp approximates the off-axis light control of the PAR flood lamp and has distinctly better off-axis light control than the reflector [floor] *flood* lamp.

Another feature of a lamp in accordance with the present invention is the reduced face luminance of these lamps when compared with reflector or PAR lamps of the same wattage. In the following table, the above ellipsoidal reflector lamp is compared with the reflector and PAR lamps of FIGS. 3 and 4.

AVERAGE FACE LUMINANCE IN FOOT-LAMBERTS

| | 40° Off-Axis | 50° Off-Axis |
|---|---|---|
| Ellipsoidal (ER-30) | 870 | 380 |
| PAR-30/flood | 880 | 540 |
| PAR-30/spot | 950 | 470 |
| Reflector/spot | 2000 | 1650 |
| Reflector/flood | 2450 | 2150 |

As is apparent from the foregoing table, the ellipsoidal reflector lamp in accordance with the present invention produces noticably less glare, i.e., has lower face luminance, than either PAR or reflector lamps. As appreciated by those of skill in the art, the results tabulated in the foregoing table are biased somewhat in favor of PAR lamps since average face luminance is given. Specifically, PAR lamps characteristically have "hot spots" which are averaged out by the photometer used for the above data. This characteristic is at once evident in a side-by-side visual comparison of the lamps. However, despite the bias, lamps in accordance with the present invention have lower off-axis brightness than either PAR or reflector lamps.

The data for the foregoing table was obtained from an ellipsoidal reflector lamp having what is known in the art as a light frost on the face of the lamp. Such a frost is sufficient to hide the filament from view when the lamp is off and serves to sufficiently diffuse the image of the filament so that the illumination from the lamp is relatively uniform, i.e., without noticeable striations. Since frosting the face of the lamp tends to increase face luminance, only enought frost effect is utilized to achieve the foregoing characteristics.

There is thus provided by the present invention an improved reflector lamp having light control on a par with PAR lamps while retaining the manufacturing advantages of blown lamps. The resultant lamp, particularly when utilized in a fixture, is more efficient since more light is projected out of the fixture rather than absorbed to reduce glare or control the size of the cone of light as in the prior art.

Having thus described the invention, it will be apparent to those of skill in the art that various modifications can be made within the spirit and scope of the present invention. For example, the frosting and silvering may each be accomplished on either the inside or outside surface of the bulb. While a frosted face is preferred, a clear face may be used when low face luminance is a paramount consideration. The light source may comprise a filament, a halogen cycle inner lamp or a high intensity gaseous discharge lamp.

What I claim as new and desire to secure by Letters Patent of the U.S. is:

1. An ellipsoidal reflector lamp characterized by low brightness and high illumination comprising:

*a filament,* a blown glass envelope having an ellipsoidal, [specular] *reflector* surface and a translucent face, wherein *the major axis of said ellipsoidal envelope approximately intersects said filament and* the minor diameter of the ellipsoid defines the approximate boundary between said surface and said translucent face, *wherein said face includes a curved portion so shaped that direct light from said filament is incident approximately normal thereto, and wherein said face includes a conical section which joins said curved portion to said ellipsoidal surface approximately at the minor diameter thereof, said conical portion forming an angle with the minor diameter at least approximately conforming to the path of the last ray reflected near the minor diameter* said ellipsoid has an eccentricity of from 0.66 to 0.88 inclusive, said face is *outwardly* positioned no further [that] *than* ½ d from the intersection of the axes of the ellipsoid, where d is the distance from said intersection to a focus of the ellipsoid, and wherein direct and reflected light are produced within approximately equal solid angles.

[2. The ellipsoidal reflector as set forth in claim 1 and futher comprising a filament intersecting the focus within said envelope.]

3. The ellipsoidal reflector lamp as set forth in claim [2] *1* wherein said face has a light frost.

4. The ellipsoidal reflector lamp as set forth in claim 3 wherein said envelope includes a neck portion having a heat shield positioned therein.

[5. The ellipsoidal reflector lamp as set forth in claim 4 wherein said face comprises a section of a spherical surface joined to said minor diameter by the frustum of a cone.]

6. The ellipsoidal reflector lamp as set forth in claim [5] *4* wherein said ellipsoid has an eccentricity of 0.78.

*7. The ellipsoidal reflector lamp as set forth in claim 1 wherein said envelope includes a neck portion having a heat shield position therein.*

*8. The ellipsoidal reflector lamp as set forth in claim 7 wherein said ellipsoid has an eccentricity of 0.78.*

*9. The ellipsoidal reflector lamp as set forth in claim 8 wherein said face has a light frost.*

*10. The ellipsoidal reflector lamp as set forth in claim 1 wherein said ellipsoid has an eccentricity of 0.78.*

*11. The ellipsoidal reflector lamp as set forth in claim 10 wherein said envelope includes a neck portion having a heat shield positioned therein.*

*12. The ellipsoidal reflector lamp as set forth in claim 11 wherein said face has a light frost.*

*13. The ellipsoidal reflector lamp of claims 1, 3, 9 or 10 wherein said filament approximately intersects the focus of said envelope.*

* * * * *